(12) United States Patent
Patil et al.

(10) Patent No.: US 12,254,868 B2
(45) Date of Patent: Mar. 18, 2025

(54) METHOD AND SYSTEM FOR SMART INTERACTION IN A MULTI VOICE CAPABLE DEVICE ENVIRONMENT

(71) Applicant: JIO PLATFORMS LIMITED, Ahmedabad (IN)

(72) Inventors: Vishal Shashikant Patil, Bengaluru (IN); Gulprit Singh, Bengaluru (IN); Rajeev Gupta, Mumbai (IN)

(73) Assignee: JIO PLATFORMS LIMITED, Ahmedabad (IN)

(*) Notice: Subject to any disclaimer, the term of this patent is extended or adjusted under 35 U.S.C. 154(b) by 486 days.

(21) Appl. No.: 17/335,786

(22) Filed: Jun. 1, 2021

(65) Prior Publication Data
US 2021/0375267 A1 Dec. 2, 2021

(30) Foreign Application Priority Data
May 31, 2020 (IN) .............................. 202021022821

(51) Int. Cl.
*G10L 15/07* (2013.01)
*G10L 15/22* (2006.01)
*G10L 15/34* (2013.01)

(52) U.S. Cl.
CPC .............. *G10L 15/07* (2013.01); *G10L 15/22* (2013.01); *G10L 15/34* (2013.01); *G10L 2015/223* (2013.01)

(58) Field of Classification Search
CPC ......... G10L 15/07; G10L 15/22; G10L 15/34; G10L 2015/223; G10L 13/033; G10L 2015/227

USPC ......................................................... 704/231
See application file for complete search history.

(56) References Cited

U.S. PATENT DOCUMENTS

| | | | | |
|---|---|---|---|---|
| 7,849,144 B2 * | 12/2010 | Prajapat | ................ | H04L 51/063 704/277 |
| 8,027,438 B2 * | 9/2011 | Daigle | .................... | H04L 51/04 704/7 |
| 11,043,220 B1 * | 6/2021 | Hansen | ................ | H04L 65/403 |
| 2012/0017146 A1 * | 1/2012 | Travieso | ................ | G06F 40/58 715/265 |

(Continued)

*Primary Examiner* — Thuykhanh Le
(74) *Attorney, Agent, or Firm* — FINNEGAN, HENDERSON, FARABOW, GARRETT & DUNNER, LLP

(57) ABSTRACT

A system and method for providing a custom response to a voice command of a specific user. The method encompasses receiving, at a transceiver unit [102] from a user device, a custom voice response preference setting associated with the specific user. The method thereafter leads to receiving, at the transceiver unit [102] from a first target device, a voice command of the specific user. The method thereafter encompasses generating, by a processing unit [104], a custom response to the voice command of the specific user based at least on the custom voice response preference setting. Further, the method encompasses identifying, by an identification unit [106], a second target device from one or more devices present in vicinity of the specific user. Thereafter, the method comprises providing, by the processing unit [104], the generated custom response to the voice command of the specific user via the second target device.

10 Claims, 5 Drawing Sheets

(56) References Cited

U.S. PATENT DOCUMENTS

| | | | |
|---|---|---|---|
| 2014/0172953 A1* | 6/2014 | Blanksteen | H04L 51/18 709/203 |
| 2016/0066166 A1* | 3/2016 | Soo | H04M 3/53391 455/406 |
| 2016/0073148 A1* | 3/2016 | Winograd | H04N 21/6582 725/18 |
| 2016/0155443 A1* | 6/2016 | Khan | G06F 3/167 704/275 |
| 2016/0364385 A1* | 12/2016 | Waibel | G10L 13/02 |
| 2017/0161320 A1* | 6/2017 | Venkataraman | H04N 21/4828 |
| 2018/0047391 A1* | 2/2018 | Baik | G10L 15/1815 |
| 2018/0130471 A1* | 5/2018 | Trufinescu | G10L 15/26 |
| 2018/0233147 A1* | 8/2018 | Tukka | G10L 15/1815 |
| 2018/0277119 A1* | 9/2018 | Baba | G10L 15/22 |
| 2018/0359364 A1* | 12/2018 | Gunther | H04M 3/5237 |
| 2019/0251960 A1* | 8/2019 | Maker | G10L 21/0316 |
| 2019/0339927 A1* | 11/2019 | Gosu | H04N 21/4828 |
| 2019/0362715 A1* | 11/2019 | Aggarwal | G10L 15/22 |
| 2019/0371312 A1* | 12/2019 | Naughton | G06F 16/9024 |
| 2019/0371313 A1* | 12/2019 | Naughton | H04M 3/4936 |
| 2019/0385594 A1* | 12/2019 | Park | G10L 15/22 |
| 2019/0385607 A1* | 12/2019 | Kim | G06F 3/167 |
| 2020/0104094 A1* | 4/2020 | White | G10L 17/00 |
| 2020/0105254 A1* | 4/2020 | Sarir | G06F 3/167 |
| 2020/0106896 A1* | 4/2020 | Kondoh | G06F 3/167 |
| 2020/0152197 A1* | 5/2020 | Penilla | H04L 67/125 |
| 2020/0177407 A1* | 6/2020 | Nakamura | H04L 12/282 |
| 2020/0177747 A1* | 6/2020 | Yasuda | H04N 1/00403 |
| 2020/0193978 A1* | 6/2020 | Kline | G10L 15/22 |
| 2020/0211543 A1* | 7/2020 | Sahabhaumik | G06F 40/205 |
| 2020/0234702 A1* | 7/2020 | Shin | G10L 15/28 |
| 2020/0251111 A1* | 8/2020 | Temkin | G06F 16/2423 |
| 2020/0294491 A1* | 9/2020 | Tang | G10L 15/05 |
| 2020/0379787 A1* | 12/2020 | Martin | G06F 16/176 |
| 2021/0042075 A1* | 2/2021 | Viedt | G06F 3/167 |
| 2021/0200597 A1* | 7/2021 | Mochizuki | G10L 15/22 |
| 2021/0201905 A1* | 7/2021 | Viedt | G10L 15/30 |
| 2021/0233537 A1* | 7/2021 | Yang | G10L 15/22 |
| 2021/0304107 A1* | 9/2021 | Fink | G06Q 10/06398 |
| 2021/0375267 A1* | 12/2021 | Patil | G10L 15/07 |
| 2022/0021765 A1* | 1/2022 | Deng | H04M 3/42017 |
| 2022/0036897 A1* | 2/2022 | Saito | G06F 3/167 |
| 2022/0051671 A1* | 2/2022 | Ogawa | G10L 15/22 |
| 2022/0108800 A1* | 4/2022 | Piani Meier | G16H 10/60 |
| 2022/0139395 A1* | 5/2022 | Mutagi | G10L 15/1815 704/235 |

* cited by examiner

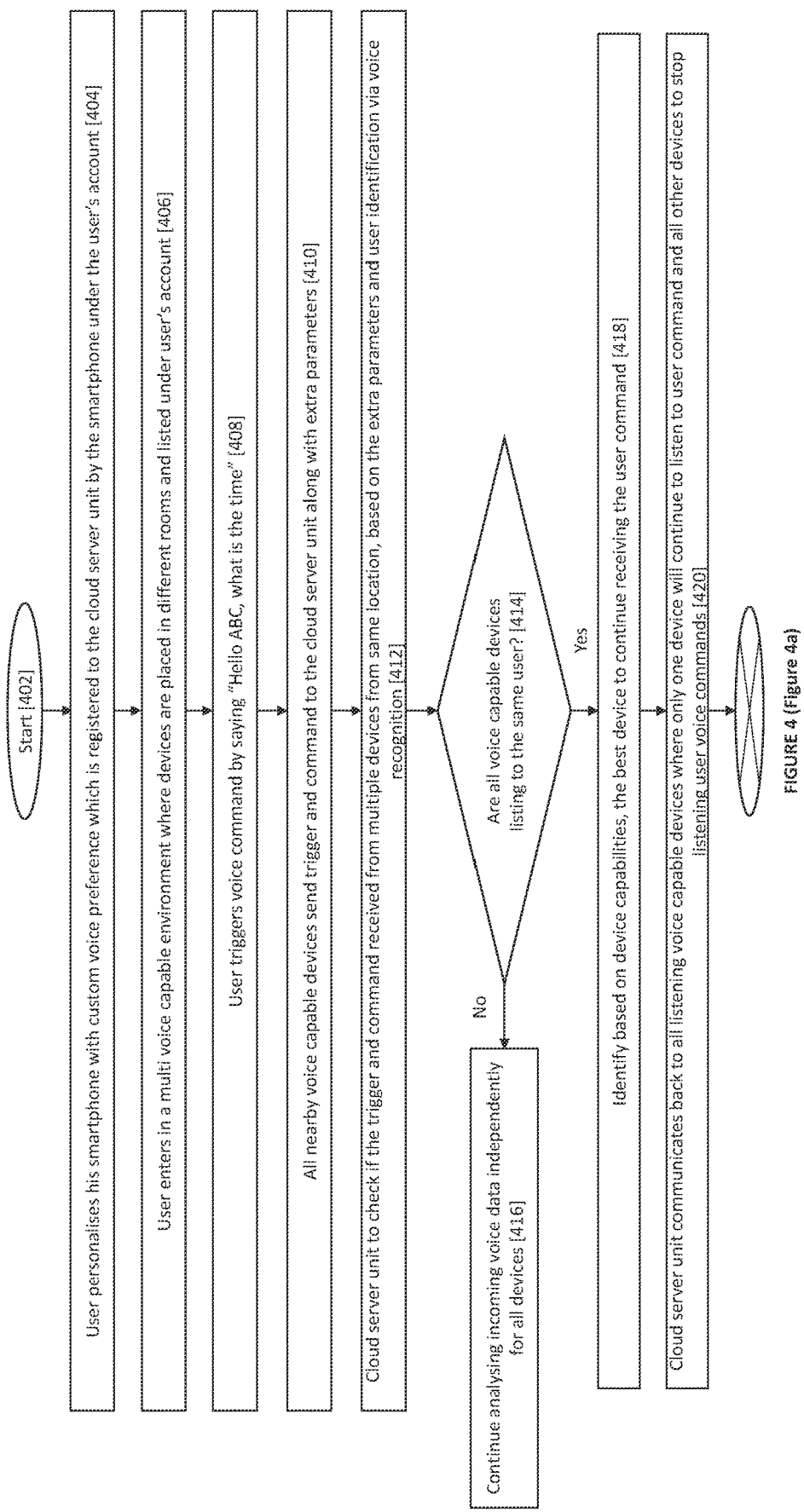

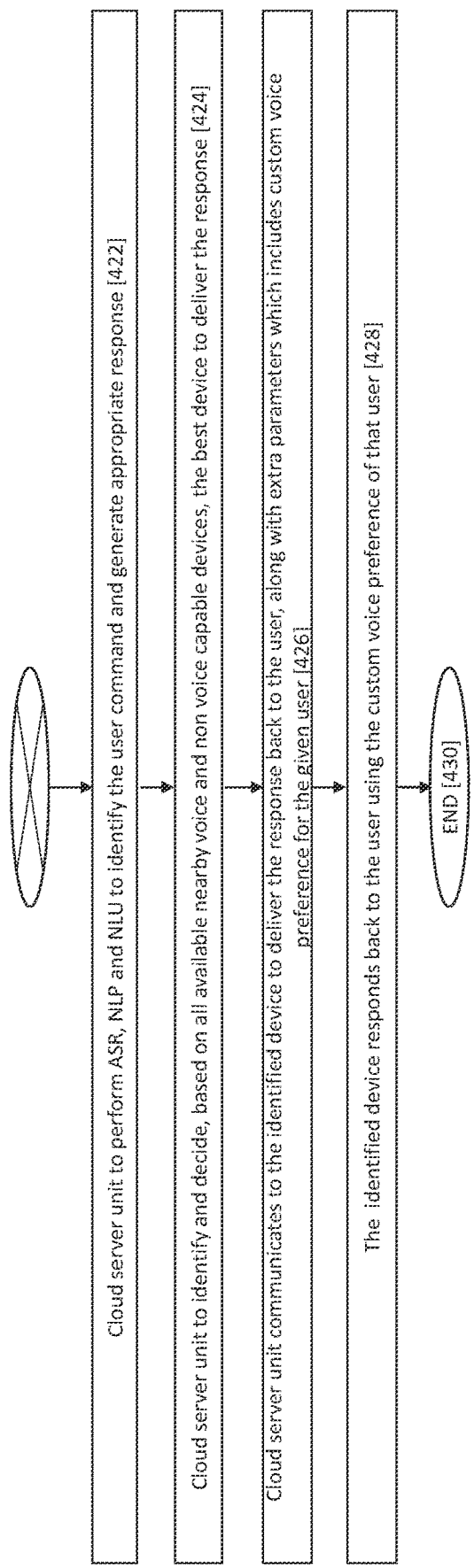
FIGURE 4 (Figure 4b)

METHOD AND SYSTEM FOR SMART INTERACTION IN A MULTI VOICE CAPABLE DEVICE ENVIRONMENT

TECHNICAL FIELD

The present invention generally relates to the field of smart voice interaction and more particularly, to systems and methods for providing a custom response to a voice command of a specific user in a multi voice capable device environment.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Over the past few years with an advancement in the digital and wireless technologies, devices such as voice capable devices and non-voice capable devices are also enhanced to a great extent. These smart devices are generally configured to provide a response to users' commands. Furthermore, the non-voice capable devices are the electronic devices that receives non-voice inputs/commands from the users or instructions from other connected voice capable devices and non-voice capable devices, to perform one or more operations such as to provide a response to a received non-voice command from a user and/or to an instruction received from other connected device. Also, the voice capable devices are the electronic device that receives voice inputs/commands from the users to provide a response to received voice commands based on various voice trigger capabilities.

These voice trigger detection enabled devices (i.e. the voice capable devices) are very common these days. Voice triggers, for example "Hello CBA", "OK ZYX", are very common and now a days many smart devices with voice trigger detection capability are available. Voice trigger detection is gaining popularity and there are many devices getting launched every year with voice trigger detection capability. From smartphones, smart TV's, smart set-top-boxes, fitness bands, smart speakers, etc. the popularity is gaining, and people are embracing the voice trigger capability. Also, today the smarts devices (i.e. the voice and non-voice capable devices) contains communication capabilities including, but not limited to, wireless communication capabilities provided by wireless networks such as LTE, Wi-Fi, Bluetooth, NB IoT etc.

Also, today a wireless network, that is widely deployed to provide various communication services such as voice, video, data, advertisement, content, messaging, broadcasts, etc. usually comprises multiple access networks and support communications for multiple users by sharing the available network resources. One example of such a network is the Evolved Universal Terrestrial Radio Access (E-UTRA) which is a radio access network standard meant to be a replacement of the Universal Mobile Telecommunications System (UMTS) and High-Speed Downlink Packet Access/High-Speed Uplink Packet Access (HSDPA/HSUPA) technologies specified in 3GPP releases 8 and beyond. Unlike HSPA, LongTerm Evolution's (LTE's) E-UTRA is an entirely new air interface system, unrelated to and incompatible with W-CDMA. It provides higher data rates, lower latency and is optimized for packet data. The earlier UMTS Terrestrial Radio Access Network (UTRAN) is the radio access network (RAN), defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. Furthermore, as the demand for mobile data and voice access continues to increase, research and development continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

Also, the wireless communication includes 5th generation mobile networks or 5th generation wireless systems, abbreviated 5G, the telecommunications standards beyond the current 4G LTE/international mobile telecommunications (IMT)-advanced standards. 5G aims at higher capacity than current 4G LTE, allowing a higher density of mobile broadband users, and supporting device-to-device, ultra-reliable, and massive machine communications. 5G also aims at lower latency than 4G equipment and lower battery consumption, for better implementation of the Internet of things (IoT) devices.

Furthermore, 3GPP has introduced Narrow Band Internet of things IoT (NB-IoT) technology in release 13. The low end IoT applications can be met with this technology. It has taken efforts to address IoT markets with completion of standardization on NB-IoT. The NB-IoT technology has been implemented in licensed bands. The licensed bands of LTE are used for exploiting this technology. This technology makes use of a minimum system bandwidth of 180 KHz i.e. one PRB (Physical Resource Block) is allocated for this technology. The NB-IOT can be seen as a separate RAT (Radio Access Technology). The NB-IOT can be deployed in 3 modes as: "in-band", "guard band" and "standalone". In the "in-band" operation, resource blocks present within LTE carrier are used. There are specific resource blocks reserved for synchronization of LTE signals which are not used for NB-IOT. In "guard band" operation, resource blocks between LTE carriers that are not utilized by any operator are used. In "standalone" operation, GSM frequencies are used, or possibly unused LTE bands are used. Release 13 contains important refinements like discontinuous reception (eDRX) and power save mode. The PSM (Power Save Mode) ensures battery longevity in release 12 and is completed by eDRX for devices that need to receive data more frequently.

Furthermore, the Internet of Things (IoT) is a network of devices, vehicles, home appliances, and other items embedded with electronics, software, sensors, actuators, and connectivity which can be readable, recognizable, locatable, addressable, and controllable via an IoT communications network that enables these things to connect and exchange data, creating opportunities for more direct integration of the physical world into computer-based systems, resulting in efficiency improvements, economic benefits, and reduced human exertions. The "Internet of things" (IoT) concept getting more and more popular, devices, such as sensors, actuators and everyday objects including the coffee makers, washing machines, headphones, lamps and wearable devices, etc. are being increasingly looked upon as potential IoT devices. IoT involves extending internet connectivity beyond standard devices, such as desktops, laptops, smartphones and tablets, to any range of traditionally dumb or non-internet-enabled physical devices and everyday objects. Embedded with technology, these devices can communicate and interact over the communication networks, and they can be remotely monitored and controlled. The term "Enterprise IoT" refers to devices used in business and corporate settings in a network of physical objects that contain embedded technology to communicate and sense or interact with their internal states or the external environment. Here, IoT refers to connected physical devices, in many cases everyday objects (things) that can communicate their status, respond to events, or even act autonomously. This enables communication among those things, closing the gap between the real and the virtual world and creating smarter processes and structures that can support user without needing their attention. IoT has evolved from the convergence of wireless technologies, micro-electromechanical systems (MEMS), and the Internet. An IoT device is generally provisioned with an IP address to provide it with the capability of transferring data and receive control signals over an IP network using the standard Internet protocols such as TCP/IP or UDP which is being exclusively used in the Internet.

Furthermore, the smart devices via the above disclosed and the like communication capabilities provides a response to a user command and/or a command received by other devices. Also, from voice capable smart devices/smart computing device such as from smartphones, smart TV's, smart Set-Top-Boxes, smart fitness bands, smart speakers and the like voice capable smart devices, the popularity of the voice trigger detection enabled devices is gaining, and people are embracing the voice trigger capability. Furthermore, a smart computing device or user equipment (UE) or user device refers to any electrical, electronic, electro-mechanical computing device or equipment or a combination of one or more of the above devices. Also, a 'smartphone' is one type of "smart computing device" that refers to a mobility wireless cellular connectivity device that allows end users to use services on cellular networks such as including but not limited to 2G, 3G, 4G, 5G and/or the like mobile broadband Internet connections with an advanced mobile operating system which combines features of a personal computer operating system with other features useful for mobile or handheld use. Also, a smartphone may have one or the other type of a subscriber identity module (SIM) card to connect to a network. These smartphones are also equipped with voice trigger capabilities to provide a response to various voice commands.

Further, the smart set top box is also an example of smart devices. Currently, the type of TV Set-Top Box (STB) most widely used is one which receives encoded/compressed digital signals from a signal source (e.g., a content provider's headend) and decodes/decompresses those signals, converting them into analog signals compatible to an analog (SDTV) television. A STB may be defined as a computerized device that processes digital information and may come in many forms and can have a variety of functions such as Digital Media Adapters, Digital Media Receivers, Windows Media Extender and most video game consoles are also examples of the set-top boxes. The STB accepts commands from user/s (often via use of remote devices such as a remote control) and transmits these commands back to the network operator which has a return path capability for two-way communication. The STB device provides satellite broadband TV services, Video on Demand, games, and the like facilities to the users. The STB also contains communication capabilities including, but not limited to, LTE, Wi-Fi, Bluetooth, NB IoT, etc. Also, the STBs can make it possible to receive and display TV signals, connect to networks, play games via a game console, provide satellite broadband TV services, Video on Demand, surf the Internet, interact with Interactive Program Guides (IPGs), display virtual channels, electronic storefronts, walled gardens, send e-mail, and videoconference. Also, many STBs are able to communicate in real time with other devices such as camcorders, DVD and CD players, portable media devices and music keyboards. Some STBs have large dedicated hard-drives and smart card slots to insert smart cards into for purchases and identification. The customer uses the STB for entertainment purposes. The users typically watch specific contents on specific channels at specific time via the STB. The user has to remember the time and channel number for playing the content every time. Also, there is an option to record content as well, however, this optionally involves connecting STB with a dedicated external hard drive and explicitly recording the desired content.

Furthermore, for voice capable devices, voice commands category can be mainly classified into following:
  a. Command for knowledge—
    i. These are commands which provide information and knowledge and usually do not result in any action. Commands like "how is the weather today?", "What is the capital of India?", "what is the time?" etc.
  b. Command to perform action—
    i. These are commands which result in performing an action. Commands like "Set alarm for 06:00 AM", "Play happy songs", "Turn off lights", etc.
  c. Conversation commands—
    i. This is conversation mode which could be just for information or may result in performing action.
    ii. Information commands are like "What is the capital of India?"->"Response"->"What is the population over there?" "response"->"How is the climate?"->"response".
    iii. Conversation commands resulting in action are like "book a cab"->"Response (what is the destination)"->"Give <destination>" "Response (book via 123 or 321"->"321"->"Response (What time)"->"Now"->"response (321 cab booked for <destination> and cab will arrive in 15 min)".

Currently, in the scenarios where users have a single voice trigger enabled device that accept voice trigger command, it is a pleasant experience for the users to use voice trigger detection on such single device around. However, in the scenarios where users have multiple voice trigger enabled devices that accept the same voice trigger command, need trigger management for superior user experience. There is a high possibility where an individual could own several voice capable smart home devices, but the currently known solutions fails to provide smart interaction in a multi voice capable device environment by providing a custom response to a voice command of a user. Some of the known solutions describes, in part, context-driven device arbitration techniques to select a speech interface device from multiple speech interface devices to provide a response to a command included in a speech utterance of a user. Also, some of the other known solutions suggests about method that comprises adjusting the matching between recognized speech and a predetermined action based on a contextual information. However, at present there are no solutions to the existing problems for voice trigger management for multiple devices through external/internal sensors to process the voice command intended to only one specific device with customized voice when user delivers voice trigger command intended to only one specific device among multiple devices that may accept and process the voice command. Also, currently the voice capable devices do not have customized voice identity where each device would speak with different voice (male or female voice). At present there is no solution to handle scenarios where user has multiple voice trigger enabled devices that accept the same voice command and provide a unified user experience across all these devices with customized voice identity. Also, currently there is no solution for user voice preference with customized voice preference set on user's personal voice enabled device. e.g.: user's personal smartphone device. Also, there is no solution where a user can set the voice output preference on a voice capable device to male or female voice and further customize the voice preference to have different voice type and voice ages e.g. child, teenage, adult, etc.

Hence, there is a need in the art to provide solution to the existing problems as defined above by providing a custom response to a voice command of a specific user based on a custom voice response preference set on said specific user's personal voice enabled device. Therefore, there is a requirement to provide a novel system and method for providing a custom response to a voice command of a specific user.

The foregoing examples of the related art and limitations related herewith are intended to be illustrative and not exclusive. Other limitations of the related art will become apparent to those of skill in the art upon a reading of the specification and a study of the figures.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a method and system for providing a custom response to a voice command of a specific user. Another object of the present invention is to provide solution for voice trigger management for multiple devices through external/internal sensors to process a voice command intended to only one specific device with customized voice when user delivers voice trigger command intended to only one specific device among multiple devices that may accept and process the voice command. Another object of the present invention is to provide solution to the voice capable devices that will have customized voice identity where each device would speak with different voice (male or female voice). Also, an object of the present invention is to provide solution to handle scenarios where user has multiple voice trigger enabled devices that accept the same voice command and provide a unified user experience across all these devices with customized voice identity. Another object of the present invention is to provide solution for user voice preference with customized voice preference set on user's personal voice enabled device. e.g.: user's personal smartphone device. An object of the present invention is to provide solution where a user can set the voice output preference to male or female voice and further customize the voice preference to have different voice type and voice ages e.g. child, teenage, adult, etc. Another object of the present invention is to provide solution to help transformation voice capability on various devices that contains wireless communication capabilities including, but not limited to, Wi-Fi, Bluetooth, NB IoT, 5G etc. Also, an object of the present invention is to provide solution to help transformation voice capability on various devices on a secure backend cloud infrastructure where all sensor information (internal and external) collected by devices is securely stored, categorized and processed using complex Artificial Intelligence (AI) and machine learning (ML) techniques to derive patterns, user preference recognition to provide enhanced user experience via voices trigger management capability. Another object of the present invention is to provide solution that will upgrade the existing devices available in market that lack the capability for voice command with customized voices to understand user voice command with new customized voice output. An object of the present invention is to provide solution to upgrade the current dumb devices with capability of voice command with customized voices based on a person's presence and preference to provide better voice command experiences. Another object of the present invention is to provide a mechanism for a seamless enhancement of existing devices for voice command with customized voices services in the user devices independent and interoperable for devices and the IoT on 5G/4G/3G/EV-Do/eHRPD capable technology. Another object of the present invention is to add value to users for content services and deliver interactive advertisements in the voice command with customized voices services in the user devices. Yet another object of the present invention is to add value with input rich information and technology rich digital content, serving dual purpose of enhancing user experience with low input cost and reducing ecological burden of adding additional devices for such functionality.

Furthermore, in order to achieve the aforementioned objectives, the present invention provides a method and system for providing a custom response to a voice command of a specific user based at least on a custom voice response preference setting associated with said specific.

A first aspect of the present invention relates to the method for providing a custom response to a voice command of a specific user. The method encompasses receiving, at a transceiver unit of a cloud server unit from a user device, a custom voice response preference setting associated with the specific user. The method thereafter leads to receiving, at the transceiver unit of the cloud server unit from a first target device, a voice command of the specific user. The method thereafter encompasses generating, by a processing unit of the cloud server unit, a custom response to the voice command of the specific user based at least on the custom voice response preference setting associated with said specific user. Further, the method encompasses identifying, by an identification unit of the cloud server unit, a second target device from one or more devices present in vicinity of the specific user. Thereafter, the method comprises providing, by the processing unit of the cloud server unit, the generated custom response to the voice command of the specific user via the second target device.

Another aspect of the present invention relates to a system for providing a custom response to a voice command of a specific user. The system comprises a transceiver unit configured to receive from a user device, a custom voice response preference setting associated with the specific user. The transceiver unit is further configured to receive, from a first target device, a voice command of the specific user. Also, the system further comprises a processing unit, configured to generate, a custom response to the voice command of the specific user based at least on the custom voice response preference setting associated with said specific user. The system also comprises an identification unit, configured to identify, a second target device from one or more devices present in vicinity of the specific user. Further, the processing unit of the system is configured to provide, the generated custom response to the voice command of the specific user via the second target device.

Also, an aspect of the present invention relates to a user equipment for providing a custom response to a voice command of a specific user. The user equipment comprises the system configured to receive from a user device, a custom voice response preference setting associated with the specific user. Thereafter, the system is configured to receive, from a first target device, a voice command of the specific user. Further the system is configured to generate, a custom response to the voice command of the specific user based at least on the custom voice response preference setting associated with said specific user. The system is further configured to identify, a second target device from one or more devices present in vicinity of the specific user. The system is thereafter configured to provide, the generated custom response to the voice command of the specific user via the second target device.

Yet another aspect of the present invention relates to a method for providing a custom response to a voice command of a specific user. The method encompasses receiving, at a transceiver unit of a user equipment from a user device, a custom voice response preference setting associated with the specific user. Further the method comprises receiving, at the transceiver unit of the user equipment from a first target device, a voice command of the specific user. The method thereafter leads to generating, by a processing unit of the user equipment, a custom response to the voice command of the specific user based at least on the custom voice response preference setting associated with said specific user. Further the method encompasses identifying, by an identification unit of the user equipment, a second target device from one or more devices present in vicinity of the specific user. The method thereafter comprises providing, by the processing unit of the user equipment, the generated custom response to the voice command of the specific user via the second target device.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 4 (i.e. FIG. 4a and FIG. 4b) illustrates an exemplary flow diagram, depicting an instance implementation of an exemplary process for providing a custom response to a voice command of a specific user, in accordance with exemplary embodiments of the present invention.

Figure 1:
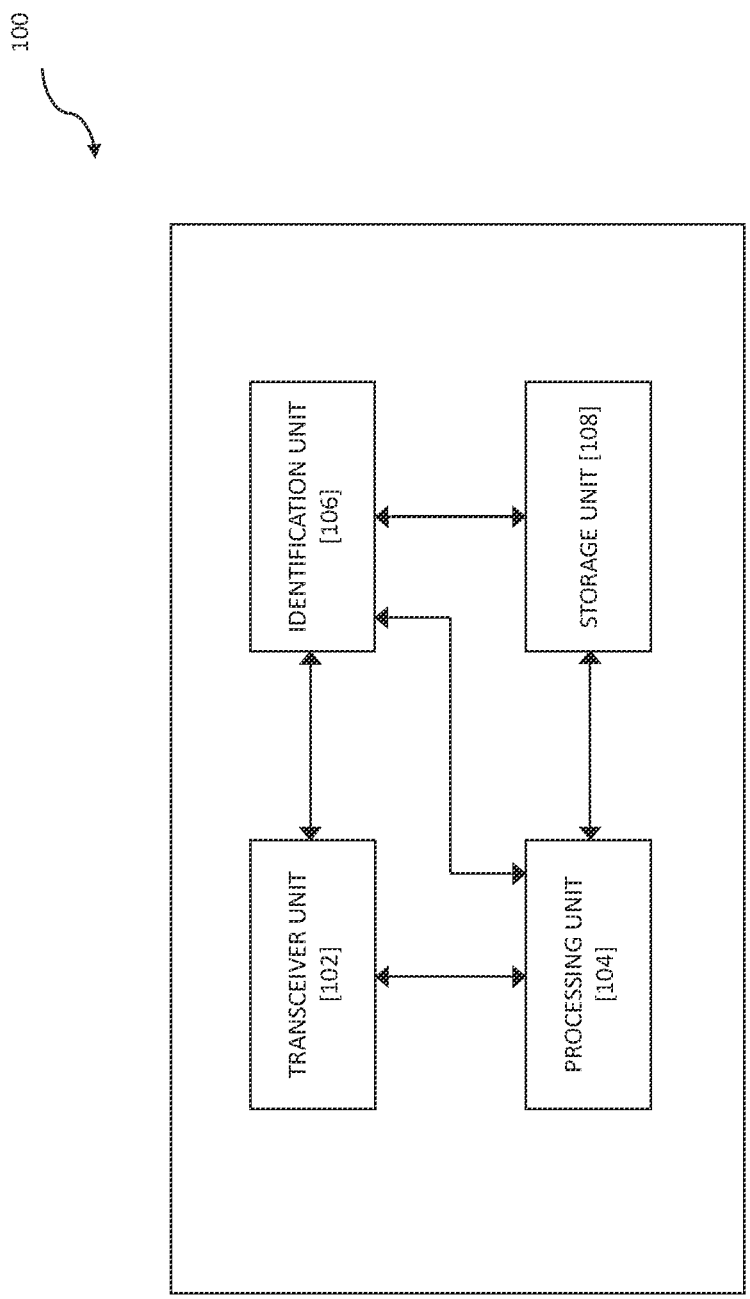
FIG. 1 illustrates an exemplary block diagram of a system [100] for providing a custom response to a voice command of a specific user, in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, audio/video, text, images, animations, databases, broadcasts, displays (including but not limited to video displays, posters and billboards), signs, signals, web pages, print media and streaming media data.

The terms "reading" and "read" as used herein mean a process or processes that serve to recover data that has been added to, encoded in, combined with or embedded in, media data.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

The terms "first", "second", "primary" and "secondary" are used to distinguish one element, set, data, object, step, process, function, activity or thing from another, and are not used to designate relative position, or arrangement in time or relative importance, unless otherwise stated explicitly. The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

Moreover, terms like "user equipment" (UE), "electronic device", "mobile station", "user device", "mobile subscriber station," "access terminal," "terminal," "smartphone," "smart computing device," "smart device", "device", "handset," and similar terminology refers to any electrical, electronic, electro-mechanical equipment or a combination of one or more of the above devices. Smart computing devices may include, voice and non-voice capable devices such as including but not limited to, a mobile phone, smart phone, virtual reality (VR) devices, augmented reality (AR)

devices, pager, laptop, a general-purpose computer, desktop, personal digital assistant, tablet computer, mainframe computer, smart set top box (STB), smart speaker, smart fitness band, smart watches, or any other computing device as required to implement the features of the present invention. In general, a smart computing device is a digital, user configured, computer networked device that can operate autonomously. A smart computing device is one of the appropriate systems for storing data and other private/sensitive information. The said device may operate at all the seven levels of ISO reference model, but the primary function is related to the application layer along with the network, session and presentation layer with any additional features of a touch screen, apps ecosystem, physical and biometric security, etc. Further, a 'smartphone' is one type of "smart computing device" that refers to the mobility wireless cellular connectivity device that allows end-users to use services on 2G, 3G, 4G, 5G and/or the like mobile broadband Internet connections with an advanced mobile operating system which combines features of a personal computer operating system with other features useful for mobile or handheld use. These smartphones can access the Internet, have a touchscreen user interface, can run third-party apps including the capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT and the like devices enable the communication on the devices. Furthermore, the foregoing terms are utilized interchangeably in the subject specification and related drawings.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. Furthermore, the term "processor" as used herein includes, but is not limited to one or more computers, hardwired circuits, signal modifying devices and systems, devices and machines for controlling systems, central processing units, programmable devices and systems, systems on a chip, systems comprised of discrete elements and/or circuits, state machines, virtual machines, data processors, processing facilities and combinations of any of the foregoing. The processor may perform signal coding data processing, input/output processing, and/or any other functionality that enables the working of the system according to the present disclosure. More specifically, the processor or processing unit is a hardware processor. The term "processor" as used herein means processing devices, apparatus, programs, circuits, components, systems and subsystems, whether implemented in hardware, tangibly-embodied software or both, and whether or not programmable.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The memory unit as used herein is configured to retain data, whether on a temporary or permanent basis, and to provide such retained data to various units to perform their respective functions.

As used herein the "Transceiver Unit" may include but not limited to a transmitter to transmit data to one or more destinations and a receiver to receive data from one or more sources. Further, the Transceiver Unit may include any other similar unit obvious to a person skilled in the art, to implement the features of the present invention. The transceiver unit may convert data or information to signals and vice versa for the purpose of transmitting and receiving respectively.

The present invention provides a novel system and method for providing a custom response to a voice command of a specific user. More particularly, the present invention provides a solution to deliver a response to a user's voice command, on any voice capable device, by using a customized voice preference set on the user's personal voice enabled device such a smartphone of the user. Also, the present disclosure provides a mechanism to over-come the challenge, when the user delivers a voice trigger command intended to only one specific device in a multi voice capable device environment, to accept and process the voice command. The present disclosure also provides a solution to the existing problems related to voice trigger management for multiple devices through external/internal sensors, to process a voice command intended to only one specific device with customized voice in an event when a user delivers a voice trigger command intended to only one specific device among multiple devices that may accept and process the triggered voice command. Also, the present invention provides a solution to the voice capable devices by providing a customized voice identity, where each device would speak with different voice (male or female voice) using the customized voice identity. Also, the present disclosure provides a solution to handle scenarios where a user has multiple voice trigger enabled devices that accept a same voice command and provide a unified user experience across all these devices with customized voice identity. The present invention also provides a solution for a user voice preference with customized voice preference set on user's personal voice enabled device. e.g.: user's personal smartphone device. Furthermore, the present invention also provides a solution where a user can set the voice output preference to a male or a female voice and further customize the voice preference to have different voice type and voice ages e.g. child, teenage, adult, etc.

Furthermore, the present invention in order to provide the above solutions encompasses use of a user's personalized voice response preference, wherein the user's personalized voice response preference is determined based on a personalization of a user device such as a smartphone of the user with a custom voice response preference. Also, the present invention encompasses identifying a voice capable device to receive a voice command of the user. Further, the present invention encompasses generating a custom response to the received voice command of the user based on the user's personalized voice response preference. More particularly, one or more ASR, NLP and NLU techniques are performed to identify the user spoken command (i.e. the voice command of the user) and to generate an appropriate response to said user spoken command. The present invention encompasses generating the custom response to the received voice command of the user by adding the user's personalized voice response preference to an information identified to provide as an answer/action in response to the voice command of the user. Further, the present invention encompasses identifying a best device from one or more devices present in the vicinity of the user, to provide the user the generated custom response, such that the identified device responds back to the user using the custom voice preference applicable for that user.

Hereinafter, exemplary embodiments of the present disclosure will be described in detail with reference to the accompanying drawings so that those skilled in the art can easily carry out the present disclosure.

Referring to FIG. 1, an exemplary block diagram of a system [100] for providing a custom response to a voice command of a specific user, in accordance with exemplary embodiments of the present invention is shown.

The system [100] comprises, at least one transceiver unit [102], at least one processing unit [104], at least one identification unit [106] and at least one storage unit [108]. Also, all of the components/units of the system [100] are assumed to be connected to each other unless otherwise indicated below. In an implementation the system [100] resides at a cloud server unit and in another implementation the system [100] is connected to the cloud server unit, to implement features of the present invention. Also, in FIG. 1 only a few units are shown, however, the system [100] may comprise multiple such units or the system [100] may comprise any such numbers of said units, as required to implement the features of the present disclosure.

The system [100], is configured to provide the custom response to the voice command of the specific user, with the help of the interconnection between the components/units of the system [100].

The processing unit [104] of the system [100] is configured to register at the cloud server unit, one or more smart devices (i.e. one or more voice capable devices and one or more non voice capable devices) present in vicinity of one or more users. Further, one or more device capabilities for each of the one or more voice capable devices and the one or more non voice capable devices is published and listed within the cloud sever unit by the processing unit [104]. The device capability includes one or more parameters indicating capabilities of each smart device (i.e. each of the one or more voice capable devices and the one or more non voice capable devices), such as including but not limited to one or more quality related parameters, one or more signal to noise ratio related parameters associated with one or more voice outputs of such smart devices, one or more display related parameters, one or more input related parameters, one or more output related parameters, one or more connectivity related parameters, one or more location related parameters, one or more device identification parameters, one or more parameters indicating supported features and other such parameters indicating capabilities of a device. Also, in an implementation, the processing unit [104] is also configured to register and store at the cloud server unit, one or more capabilities of all smart devices (including voice trigger enabled devices and non-voice capable devices) belonging to a particular user. Further, in an implementation the capabilities of a smart device may include but not limited to:

a. For voice enabled/capable devices—Type of microphone used (single channel or multi-channel array), type of multimedia speaker used (mono, stereo, single or multi-speaker environment, etc.), display capabilities, and/or location of device etc.
b. For non-voice capable devices—Type of device, location, features supported etc.
c. User voice preference—The customized voice preference set on user's personal voice enabled device. e.g.: User's personal smartphone device etc.

Further, to provide the custom response to the voice command of the specific user, once the one or more voice capable devices and the one or more non voice capable devices are registered on the cloud server unit, the transceiver unit [102] of the system [100] is configured to receive at the cloud server unit from a user device of the specific user a custom voice response preference setting associated with the specific user. In an implementation, the user device of the specific user is a personal voice enabled/capable device of said specific user. The custom voice response preference setting is configured at the user device based on one of a user input and an automatic recommendation. Also, the custom voice response preference setting further comprises a customized voice identity such as a specific user preferred voice type and/or a specific user preferred voice age. For example, whenever a user personalizes his smartphone/user device with a custom voice response preference (i.e. a customized voice identity) based on one of a user input and an automatic recommendation, the smartphone updates the cloud server unit with a custom voice response preference setting for said user, wherein the custom voice response preference setting comprises the customized voice identity. For instance, in the given example a male voice of age 40 years may be configured at the smartphone as the custom voice response preference based on a user input or a female voice of age 35 years may be configured at the smartphone as the custom voice response preference based on an automatic recommendation. Further such male voice of age 40 years or the female voice of age 35 years may be received at the cloud server unit from the smartphone as the customized voice identity in the custom voice response preference setting.

Further, the transceiver unit [102] is configured to receive at the cloud server unit from a first target device, a voice command of the specific user. The first target device is a voice capable device identified from one or more voice capable devices present in vicinity of the specific user, to receive the voice command of the specific user and the first target device is identified based on one or more device capabilities of the one or more voice capable devices present in vicinity of the specific user. More particularly, the first target device is identified based on at least one of a real time GPS location data associated with the one or more voice capable devices, a device ID of the one or more voice capable devices, a voice command trigger timestamp associated with the one or more voice capable devices, a signal to noise ratio (SNR) associated with the one or more voice capable devices and a Quality parameter (QoS) associated with the one or more voice capable devices and the other such parameters indicating one or more capabilities of the one or more voice capable devices. For example, whenever a user triggers a voice command, all nearby voice capable devices of the user transmits a trigger and the voice command to the transceiver unit [102] along with one or more parameters indicating device capabilities of all the nearby voice capable devices, such as current GPS location, device ID, trigger timestamp, SNR, etc. Thereafter, the processing unit [104] is configured to check if the trigger and the voice command are coming from multiple voice capable devices from a same location, based on the one or more parameters indicating device capabilities of all the nearby voice capable devices. The processing unit [104] is also configured to identify if the trigger and the voice command is coming from a same user using one or more voice recognition techniques. Once it is identified that the trigger and the voice command is coming from the from multiple voice capable devices from the same location and also from the same user, the processing unit [104] is configured to identify, one or more parameters indicating device capabilities such as QoS, SNR, etc. associated with each voice capable device from all the nearby voice capable devices based on the one or more parameters indicating device capabilities of all the nearby voice capable devices, to further decide which is the best device (i.e. the first target device) to continue receiving user's voice commands. For instance: the processing unit [104] may identify a voice capable device with best microphone and good QoS with very less SNR as the first target device. Once the first target device is identified the processing unit [104] of the cloud server unit is configured to communicate back to all the listening devices (i.e. all the nearby voice capable devices) via the transceiver unit [102], where, only one device i.e. the first target device will continue to listen to the user command and all other devices will stop listening the user voice commands. Also, in an implementation for a particular voice command of the user, any voice capable device present nearby the user can be selected as the first target device based on real time device capabilities of the one or more nearby voice capable devices.

The processing unit [104] is configured to generate, a custom response to the voice command of the specific user based at least on the custom voice response preference setting associated with said specific user. Also the processing unit [104] is configured to perform at least one of an Automatic Speech Recognition (ASR), Natural Language Processing (NLP) and Natural Language Understanding (NLU) techniques to identify the specific user spoken command (i.e. the voice command of the specific user) and to generate a response to said specific user spoken command (i.e. the custom response to the voice command of the specific user). In an implementation, the custom response to the voice command of the specific user generated by the processing unit [104] is also based on at least one a sensor data received from one or more sensors, a user device data associated with the user device of the specific user and a contextual data associated with the specific user. For example, if a voice command of user A i.e. "Hey ABC—what is the room temperature" is received by the transceiver unit [102] from a smartwatch (i.e. first target device), the processing unit [104] in such scenario is configured to generate a custom response to the voice command "Hey ABC—what is the room temperature" based on a temperature sensor configured in the room and the custom voice response preference setting received from a smartphone of the user A. For instance, if in the given example, the custom voice response preference setting received from the smartphone of the user A comprises a male voice of age 20 years as customized voice identity and the temperature of the room is identified as 25 degree Celsius by the temperature sensor, in such instance the custom response generated by the processing unit [104] comprises—an information indicating that the room temperature is 25 degree Celsius along with one or more parameters indicating to deliver the information (i.e. the room temperature is 25 degree Celsius) in the customized voice identity (i.e. the male voice of age 20 years).

Thereafter, the identification unit [106] is configured to identify, a second target device from one or more devices present in vicinity of the specific user. The second target device is identified to provide to the specific user the generated custom response, in response to the specific user's voice command. Also, the second target device is identified based on one or more device capabilities of the one or more devices present in the vicinity of the specific user. More particularly, the identification unit [106] is configured to identify best device to deliver the custom response to the voice command of the specific user. In an example, a device with best speaker or a device with best display and an average speaker is identified by the identification unit [106] as the second target device based on a response type of a generated custom response such as an audio response or an audio-video response, respectively.

Further the processing unit [104] is configured to provide, the generated response to the voice command of the specific user via the second target device. More particularly, the processing unit [104] is configured to, provide the generated response to the voice command via the second target device using the customized voice identity. Considering an example, where a generated custom response to a voice command of a user 1 comprises an information—the time is 9:00 PM along with one or more parameters indicating to deliver the information (i.e. the time is 9:00 PM) in a customized voice identity comprising a female voice of age 25 years, wherein the customized voice identity is configured at a user device of the user 1 as the user 1's voice preference. In the given scenario, the processing unit [104] is configured to provide to the user 1 via a second target device (for instance via a smart speaker), the information i.e. the time is 9:00 PM in the female voice of age 25 years as the custom response to the voice command of the user 1. To provide said custom response to the voice command of the user 1, the processing unit [104] is configured to provide to the smart speaker the generated custom response i.e. the information indicating the time is 9:00 PM along with the one or more parameters indicating to deliver said information in the female voice of age 25 years. Once, the smart speaker receives the generated custom response, it responds back to the user 1 with the information indicating the time is 9:00 PM using the female voice of age 25 years i.e. using the custom voice preference received from the user device of the user 1.

Also, a use case based on the implementation of the features of the present invention is provided as below:

In an event when user B says a trigger command (say "Hello ABC"):

1. If there are multiple voice trigger capable devices present in the vicinity of the user B, all these devices will capture the trigger command i.e. "Hello ABC" and send it to the transceiver unit [102] of the system [100] configured at a cloud server unit for trigger detection and/or speaker verification, along with few extra parameters like current GPS location, device ID, timestamp of trigger etc.
2. The processing unit [104] of the system [100], based on the incoming voice trigger i.e. "Hello ABC", is configured to first identify the user B. Once the user B is identified, the processing unit [104] identifies which all voice capable devices from a same GPS location and at a same timestamp detected the voice trigger "Hello ABC".
3. Based on trigger parameters, like QoS, SNR (Signal to Noise ratio), etc. and capabilities of the all voice enabled device, the processing unit [104] is configured to derive a best available device (i.e. a first target device) and respond back to that device to continue to listen to voice command(s) of user B. If the quality of user speech is maintained, the processing unit [104] continues the listening to only one device (i.e. the first target device) and ignore voice speech coming from other devices from the same GPS location for the user B.

4. After detection of the voice trigger, the processing unit [104] is configured to generate a custom response to the voice command of the user B based at least on a custom voice response preference setting received from a user device of the user B. More specifically, in an implementation once the processing unit [104] performs ASR, NLP and NLU on the voice command of the user B, it first computes a command category such as a command for knowledge and then generate a desired response (i.e. custom response to the voice command of the user B) based at least on the custom voice response preference setting associated with the user B. The generated custom response could be a simple voice response or an action with a voice response. Thereafter, based on all available user B's voice capable and/or non-voice capable devices in the same location, the identification unit [106] is configured to identify the best device available as a second target device to communicate back to the user B and the best device available to perform an action, if necessary.

5. In an implementation devices identified to deliver the speech to communicate back to user B (i.e. the second target device), and the device identified to perform necessary action could be the same device or could be different devices, based on the location of the user B and the device on which the action is performed.

6. After generation of the custom response to the voice command of the user B and identification of the second target device, the processing unit [104] is further configured to provide, the generated custom response to the voice command of the user B via the second target device. More particularly, to provide the response to the voice command of the user B, based on user's voice preference, the processing unit [104], temporarily sets the user B's voice preference on the device identified to deliver the speech (i.e. second target device), to communicate back to the user B.

7. Also, in an implementation any voice command could result into a conversation mode. The processing unit [104], based on previous contextual information of the user B and based on other parameters like time of the day, location, date, etc. predict a possibility for a specific command to convert into a conversation mode. Based on this prediction as one of the parameters, the identification unit [104] decides the best device available to communicate the custom response back to the user B.

Figure 2:
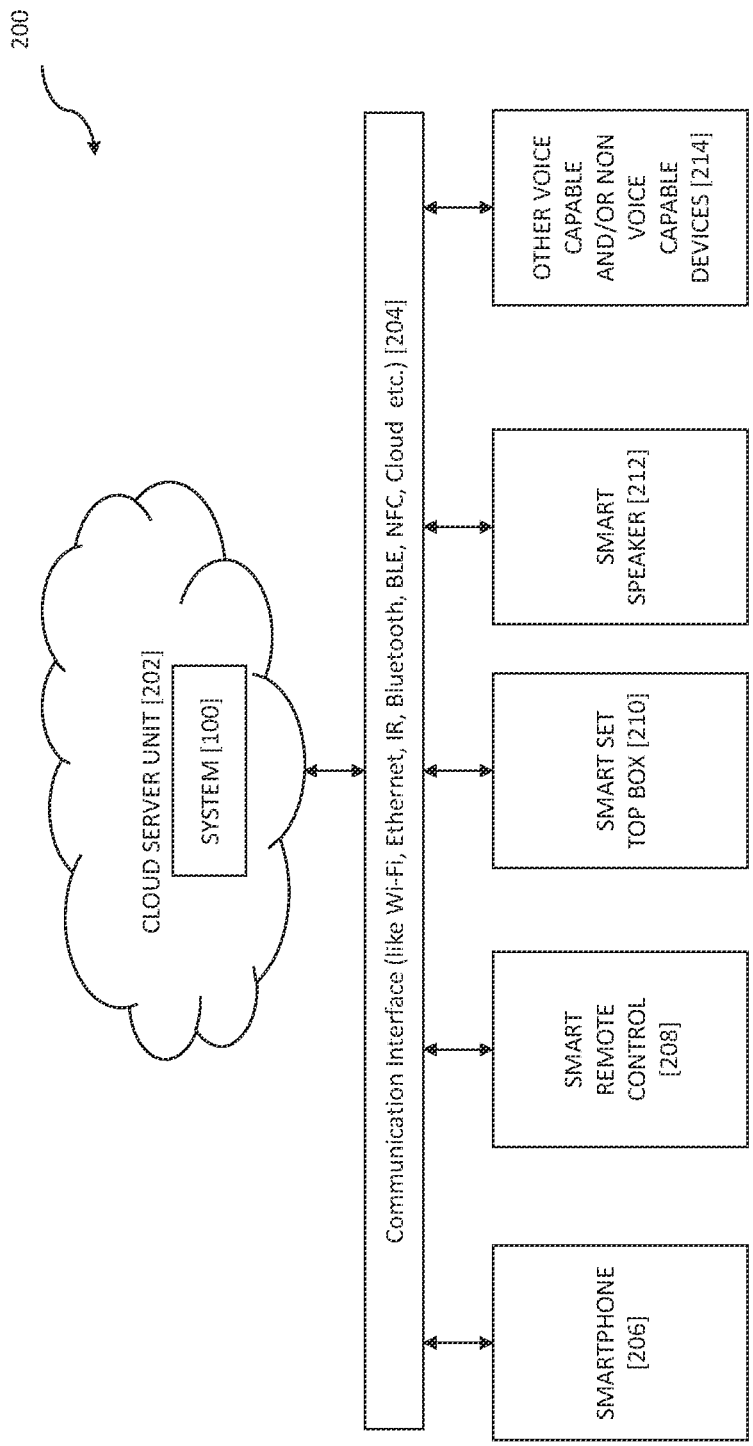
FIG. 2 illustrates an exemplary network architecture diagram [200] for providing a custom response to a voice command of a specific user, in accordance with exemplary embodiments of the present invention.

Furthermore, FIG. 2 illustrates an exemplary network architecture diagram [200] for providing a custom response to a voice command of a specific user, in accordance with exemplary embodiments of the present invention.

The network architecture diagram [200] indicates that a cloud server unit [202] is connected to various smart devices such as a smartphone [206], a smart remote control [208], a smart set top box [210], a smart speaker [212] and other such voice capable and non-voice capable devices [214] via a communication interface (like Wi-Fi, Ethernet, IR, Bluetooth, BLE, NFC, and/or Cloud etc.) [204]. Furthermore, the FIG. 2 also indicates that the cloud server unit [202] comprises the system [100]. Also, in FIG. 2 only a few units are shown, however, the network architecture diagram [200] may comprise multiple such units or the network architecture diagram [200] may comprise any such numbers of said units, as required to implement the features of the present disclosure.

Moreover, the FIG. 2 provides an overall network architecture view of the voice capable devices (for instance [206], [208], [210], [212]) that are connected to the secured cloud server unit [202] (i.e. computing backend for voice data processing). In an implementation the smart devices of the network architecture [200] for providing a custom response to a voice command of a specific user and for controlling other devices remotely via the cloud server unit [202], may be implemented in a typical home environment, i.e. the home having multi voice capable device environment. For instance, the living room in such typical home environment may contain a smart STB, a smart speaker and smart phone(s). The Kitchen room may contain a smart speaker and smart phone(s). One or more bedrooms may contain a smart STB, smart speaker and smart phone(s) and study room may contain smart phone(s). Also, the components of the network architecture [200] are provided below:

The smart Set-Top-Box (smart STB) [210] receives, decodes and displays digital signals and also supports IPTV, gaming, etc. The smart STB have multiple communication interfaces like IR, Bluetooth, BLE, Wi-Fi, NFC, Cloud etc. through which it connects to external devices within/outside a house/building including, but not limited to, thermostats, smart door locks, smart bulbs, smartphones, home surveillance systems, home automation systems, fitness bands, etc. In an implementation a Wi-Fi mesh device connects all home sensors including, but not limited to, thermostat, smart door lock, smart bulbs, smart switches, smart STB/TV, smartphones, home surveillance systems, home automation systems, etc. and has the capability to control these devices. The Remote-control unit (RCU) [208] connects to smart STB [210] including sensors like accelerometer, mic, gyroscope, fingerprint, mic etc. and also it connects to the STB [210] via IR (InfraRed), BLE (Bluetooth Low Energy) or any other communication mechanism that is able to transmit sensor data to the STB [210]. A Voice POD, when connected to the STB (via. USB) [210], provides a voice trigger capability to the existing STB [210]. The other components in the network architecture diagram [200] as follows:

1. A Smartphone with voice trigger capability [206].
2. A Smart Speaker with voice trigger capability [212].
3. Other voice capable and/or non-voice capable devices such as a Music Box which plays online music (via music applications) and has voice trigger capability [214].

The smart devices (i.e. the smartphone [206], the smart remote control [208], the smart set top box [210], the smart speaker [212] and other such voice capable and non-voice capable devices [214]) are connected with the cloud server unit [202] comprising the system [100]. Also, all sensor information (for instance internal and external sensor data collected by the smart devices) is securely stored, categorized and processed using complex artificial intelligence (AI) and machine learning (ML) modules to recognize voice patterns of user/s, usage pattern of user/s (for example user preference recognition) to provide better user experience. In an implementation the cloud server unit [202] may also have modules having such as natural language understanding (NLU) and natural language processing (NLP) capabilities for supporting all voice and non-voice capable devices.

Also, an aspect of the present invention relates to a user equipment for providing a custom response to a voice command of a specific user. The user equipment comprises the system [100] configured to receive from a user device, a custom voice response preference setting associated with the specific user. Thereafter, the system [100] is configured to receive, from a first target device, a voice command of the specific user. Further the system [100] is configured to generate, a custom response to the voice command of the specific user based at least on the custom voice response preference setting associated with said specific user. The system [100] is further configured to identify, a second target device from one or more devices present in vicinity of the specific user. The system [100] is thereafter configured to provide, the generated custom response to the voice command of the specific user via the second target device.

Figure 3:
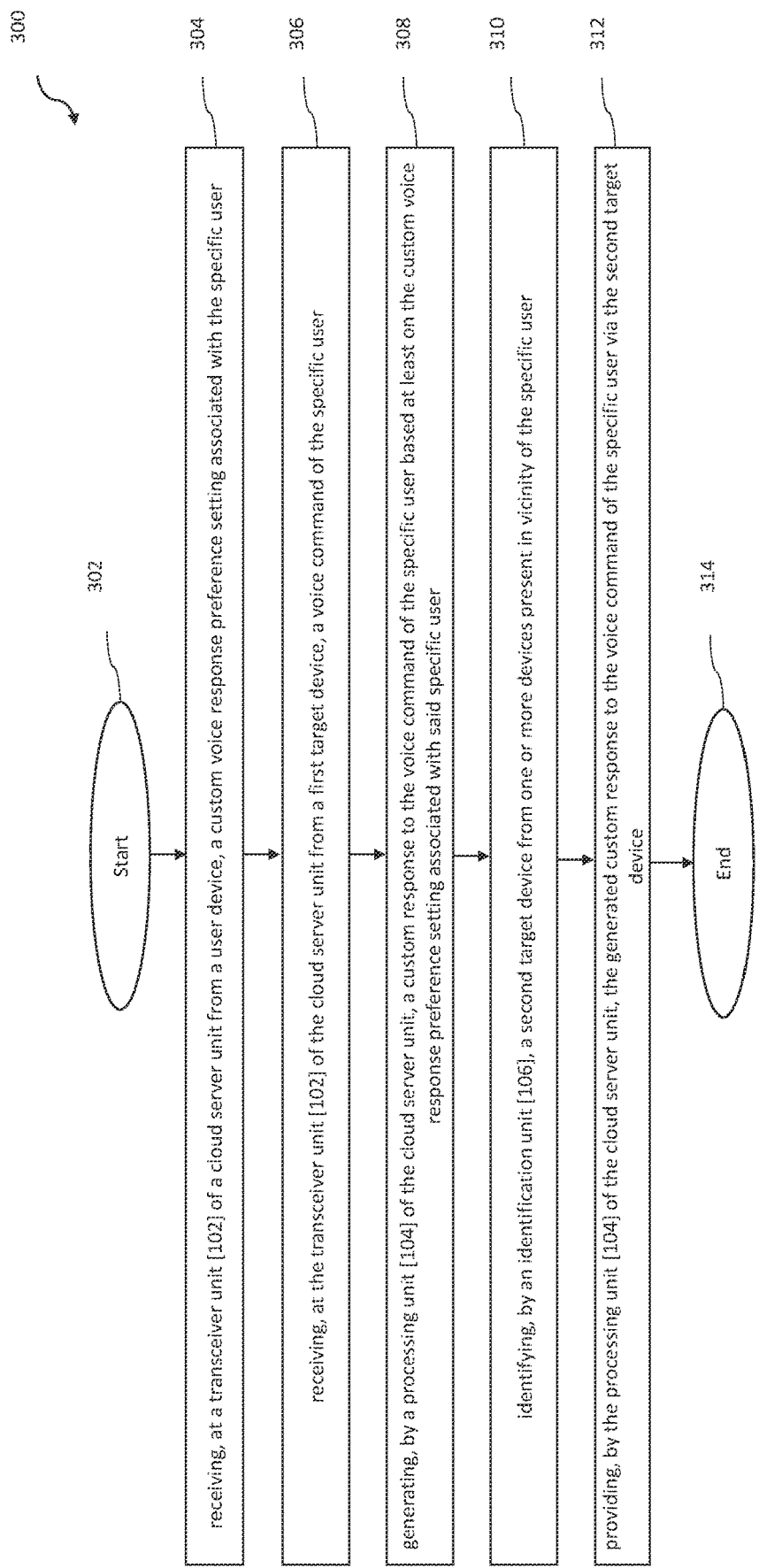
FIG. 3 illustrates an exemplary method flow diagram [300], depicting a method for providing a custom response to a voice command of a specific user, in accordance with exemplary embodiments of the present invention.

Referring to FIG. 3, an exemplary method flow diagram [300], depicting a method for providing a custom response to a voice command of a specific user, in accordance with exemplary embodiments of the present invention is shown. In an implementation the method is performed at a cloud server unit, by a system [100] implemented at the cloud server unit. Also as shown in FIG. 3, the method starts at step [302].

The method comprises registering at the cloud server unit via a processing unit [104] of the cloud server unit, one or more voice capable devices and one or more non-voice capable devices present in vicinity of one or more users. Further, the method comprises publishing and listing by the processing unit [104], one or more device capabilities for each of the one or more voice capable devices and the one or more non-voice capable devices at the cloud sever unit. The device capability includes one or more parameters indicating capabilities of each smart device (i.e. each of the one or more voice capable devices and the one or more non-voice capable devices), such as including but not limited to one or more quality related parameters, one or more signal to noise ratio related parameters associated with a voice output, one or more connectivity related parameters, one or more location related parameters, one or more device identification parameters and other such parameters indicating capabilities of a device. Also, in an implementation, the method also encompasses registering and storing by the processing unit [104] at the cloud server unit, one or more capabilities of all smart devices (including voice trigger enabled devices and non-voice capable devices) belonging to a particular user. The method also encompasses registering and storing by the processing unit [104] at the cloud server unit, a customized voice preference set on one or more users' personal voice enabled device(s). e.g.: User's personal smartphone device etc.

Further, to provide the custom response to the voice command of the specific user, once the one or more voice capable devices and the one or more non-voice capable devices are registered on the cloud server unit, the method at step [304] comprises receiving, at a transceiver unit [102] of the cloud server unit from a user device of the specific user, a custom voice response preference setting associated with the specific user. In an implementation, the user device of the specific user is a personal voice enabled/capable device of said specific user. The custom voice response preference setting is configured at the user device based on one of a user input and an automatic recommendation. Also, the custom voice response preference setting further comprises a customized voice identity such as the specific user preferred voice type and/or the specific user preferred voice age. For example, whenever a user personalizes his smartwatch/user device with a custom voice response preference (i.e. a customized voice identity) based on one of a user input and an automatic recommendation, the smartwatch updates the cloud server unit with a custom voice response preference setting for said user, wherein the custom voice response preference setting comprises the customized voice identity. For instance, in the given example a female voice of age 30 years may be configured at the smartwatch as the custom voice response preference based on a user input or a male voice of age 45 years may be configured at the smartwatch as the custom voice response preference based on an automatic recommendation. Further such female voice of age 30 years or the male voice of age 45 years may be received at the cloud server unit from the smartwatch as the customized voice identity in the custom voice response preference setting.

Next, at step [306] the method comprises receiving, at the transceiver unit [102] of the cloud server unit from a first target device, a voice command of the specific user. The first target device is a voice capable device identified from one or more voice capable devices present in vicinity of the specific user, to receive the voice command of the specific user and the first target device is identified based on one or more device capabilities of the one or more voice capable devices present in vicinity of the specific user. More particularly, the first target device is identified based on at least one of a real time GPS location data associated with the one or more voice capable devices, a device ID of the one or more voice capable devices, a voice command trigger timestamp associated with the one or more voice capable devices, a signal to noise ratio (SNR) associated with the one or more voice capable devices, a Quality parameter (QoS) associated with the one or more voice capable devices and the other such parameters indicating one or more capabilities of the one or more voice capable devices. For example, whenever a user triggers a voice command, all nearby voice capable devices of the user transmits a trigger and the voice command to the transceiver unit [102] of the cloud server unit along with one or more parameters indicating device capabilities of all the nearby voice capable devices, such as current GPS location, device ID, trigger timestamp, SNR, etc. Thereafter, the method encompasses checking by the processing unit [104], if the trigger and the voice command are coming from multiple voice capable devices from a same location, based on the one or more parameters indicating device capabilities of all the nearby voice capable devices. The method also encompasses identifying by the processing unit [104], if the trigger and the voice command is coming from a same user using one or more voice recognition techniques. Once it is identified that the trigger and the voice command is coming from the from multiple voice capable devices from the same location and also from the same user, the method comprises identifying by the processing unit [104], one or more parameters indicating device capabilities such as QoS, SNR, etc. associated with each voice capable device from all the nearby voice capable devices based on the one or more parameters indicating device capabilities of all the nearby voice capable devices, to further decide which is the best device (i.e. the first target device) to continue receiving user's voice commands. For instance: the method may comprise identifying by the processing unit [104], a voice capable device with best microphone and good QoS with very less SNR as the first target device. Once the first target device is identified the processing unit [104] of the cloud server unit communicates back to all the listening devices (i.e. all the nearby voice capable devices) via the transceiver unit [102], where, only one device i.e. the first target device will continue to listen to the user command and all other devices will stop listening the user voice commands. Also, in an implementation for a particular voice command of the user, any voice capable device present nearby the user can be selected as the first target device based on real time device capabilities of the one or more nearby voice capable devices.

Thereafter, at step [308] the method comprises generating, by a processing unit [104] of the cloud server unit, a custom response to the voice command of the specific user based at least on the custom voice response preference setting associated with said specific user. Also the method encompasses performing by the processing unit [104], at least one of an Automatic Speech Recognition (ASR), Natural Language Processing (NLP) and Natural Language Understanding (NLU) techniques to identify the specific user spoken command (i.e. the voice command of the specific user) and to generate a response to said specific user spoken command (i.e. the custom response to the voice command of the specific user). In an implementation, the custom response to the voice command of the specific user generated by the processing unit [104] is also based on at least one a sensor data received from one or more sensors, a user device data associated with the user device of the specific user and a contextual data associated with the specific user. For example, if a voice command of user 1 i.e. "Hey XYZ—what is the time" is received by the transceiver unit [102] from a smartphone (i.e. first target device), in such scenario the method encompasses generating by the processing unit [104], a custom response to the voice command "Hey XYZ—what is time" based on a user device data and a custom voice response preference setting received from the smartphone of the user 1. For instance, if in the given example, the custom voice response preference setting received from the smartphone of the user 1 comprises a female voice of age 40 years as customized voice identity and the current time is identified 5:00 PM, in such instance the custom response generated by the processing unit [104] comprises—an information indicating that the time is 5:00 PM along with one or more parameters indicating to deliver the information (i.e. the time 5:00 PM) in the customized voice identity (i.e. the female voice of age 40 years).

Further, at step [310] the method comprises identifying, by an identification unit [106] of the cloud server unit, a second target device from one or more devices present in vicinity of the specific user. The second target device is identified to provide to the specific user the generated custom response, in response to the specific user's voice command. Also, the second target device is identified based on one or more device capabilities of the one or more devices present in the vicinity of the specific user. More particularly, the method comprises identifying by the identification unit [106], best device to deliver the custom response to the voice command of the specific user. In an example, a device with best speaker or a device with best lightning effect and an average speaker is identified by the identification unit [106] as the second target device based on a response type of a generated custom response such as an audio response or an audio and light effect based response, respectively.

Next, at step [312] the method comprises providing, by the processing unit [104] of the cloud server unit, the generated custom response to the voice command of the specific user via the second target device. More particularly, the step of providing, by the processing unit [104] of the cloud server unit, the generated custom response to the voice command further comprises providing via the second target device, the generated response to the voice command using the customized voice identity. Considering an example, where a generated custom response to a voice command of a user A comprises an information—the time is 8:00 AM along with one or more parameters indicating to deliver the information (i.e. the time is 8:00 AM) in a customized voice identity comprising a male voice of age 35 years, wherein the customized voice identity is configured at a user device of the user A as the user A's voice preference. In the given scenario, the method encompasses providing by the processing unit [104], to the user A, via a second target device (for instance via a smartwatch), the information i.e. the time is 8:00 AM in the male voice of age 35 years as the custom response to the voice command of the user A. To provide said custom response to the voice command of the user A, the method encompasses providing by the processing unit [104], to the smartwatch the generated custom response i.e. the information indicating the time is 8:00 AM along with the one or more parameters indicating to deliver said information in the male voice of age 35 years. Once, the smartwatch receives the generated custom response, it responds back to the user A with the information indicating the time is 8:00 AM using the male voice of age 35 years i.e. using the custom voice preference received from the user device of the user A.

After providing the custom response to the voice command of the specific user, the method terminates at step [316].

Also, a few use cases based on the implementation of the features of the present invention are provided as below:

Use Case I—

Let's assume user 1 has set Male voice as preferred voice identity and user 2 has set Female voice as preferred voice identity on their respective smartphones.

I. If user 1 said "Hello ABC, what is the weather in Mumbai", in a multi-voice capable device environment, the method encompasses receiving at a transceiver unit [102] of a cloud server unit, the trigger command i.e. "Hello ABC, what is the weather in Mumbai", from multiple voice capable devices such as Smart STB, Voice POD, Smartphone, Smart Speaker, etc. at a same time. Based on method, a processing unit [104] of the cloud server unit may decide the Smart Speaker to continue listening for voice command of the user 1 and once the command is received, the processing unit [104] may decide to provide results on a TV via the Smart STB. While doing so, the method encompasses communicating by the processing unit [104] to the Smart STB to use Male voice as preferred voice identity, as per the user 1's customized voice preference setting.

II. Also, if user 2 said "Hello ABC, video call user 1", in a multi-voice capable device environment, the method encompasses receiving at the transceiver unit [102] the trigger command i.e. "Hello ABC, video call user 1" from multiple devices such as a Smart STB, a Voice POD, a Smartphone, a Smart Speaker, etc. at a same time. Based on method, the processing unit [104] may decides the Smart Speaker to continue listening for voice command of the user 2 and once said command is received, the processing unit [104], based on context information, may decide to call contact "user 1" on either the Smartphone or on the smart STB.

III. Further, if user 2 enters in a conversation mode and says "Hello ABC, book a cab", in a multi-voice capable device environment, the method encompasses receiving at the transceiver unit [102], the trigger command i.e. "Hello ABC, book a cab" from multiple devices (e.g. Smart STB, Voice POD, Smartphone, Smart Speaker, etc.), at a same time. Based on method, the processing unit [104] may decide the Smart Speaker, to deliver conversation speech responses to the user 2 and for voice command inputs from the user 2. Once the complete conversation command/information is received, the processing unit [104], based on context information, may decide the Smartphone as the best device to execute the command. While doing so, the method encompasses communicating by the processing unit [104] to the Smart Speaker to use Female voice as preferred voice identity, as per the user 2's customized voice preference setting.

Use Case II—

I. In an implementation after detection of a voice trigger of a user 1, the method encompasses computing by the processing unit [104] a command category (such as a communication command) along with an advertisement and then the method encompasses generating by the processing unit [104], a desired response (i.e. custom response to the voice command/trigger) along with the advertisement. In an implementation said response could be a simple voice response or an action with the voice response. Based on all available user's voice capable and/or non-voice capable devices present in vicinity of the user 1, the identification unit [106] identifies which is the best device available along with the best suitable advertisement to communicate back to the user 1 and which is the best device available to perform the action, if necessary.

II. In an implementation, the devices identified to deliver the advertisement with speech, to communicate back to the user 1 and the device identified to perform the necessary action could be the same device or could be different devices, based on the location of the user 1 and the device on which the action is performed.

III. While providing the response to the user 1, based on user's voice preference, the processing unit [104], temporarily sets the user 1's voice preference on the device identified to deliver the speech and advertisement, to communicate back to the user 1.

IV. In an implementation, any voice command could result into a conversation mode. The method via the processing unit [104], based on previous contextual information of the user 1 and based on other parameters like time of the day, location, date, etc. predicts a possibility fora specific command to convert into a conversation mode. Based on this prediction as one of the parameters, the method encompasses deciding by the identification unit [106], which is the best device available to communicate the response back to the user 1 with speech and advertisement.

Furthermore, an aspect of the present invention relates to a method for providing a custom response to a voice command of a specific user. The method encompasses receiving, at a transceiver unit [102] of a user equipment from a user device, a custom voice response preference setting associated with the specific user. Further the method comprises receiving, at the transceiver unit [102] of the user equipment from a first target device, a voice command of the specific user. The method thereafter leads to generating, by a processing unit [104] of the user equipment, a custom response to the voice command of the specific user based at least on the custom voice response preference setting associated with said specific user. Further the method encompasses identifying, by an identification unit [106] of the user equipment, a second target device from one or more devices present in vicinity of the specific user. The method thereafter comprises providing, by the processing unit [104] of the user equipment, the generated custom response to the voice command of the specific user via the second target device.

Referring to FIG. 4 (i.e. FIG. 4a and FIG. 4b), an exemplary flow diagram, depicting an instance implementation of an exemplary process for providing a custom response to a voice command of a specific user, in accordance with exemplary embodiments of the present invention is shown. As shown in FIG. 4 the method starts at step [402].

At step [404], a user personalizes his smartphone with custom voice preference which is further registered to the cloud server unit by the smartphone under the user's account. For instance, if the user personalizes his smartphone with a male voice of age 30 years as the custom voice preference, said male voice of age 30 years is registered to the cloud server unit by the smartphone of the user under the user's account at the cloud server unit.

Further, step [406] indicates that the user enters in a multi voice capable environment in a building, where multiple smart devices are placed in different rooms of the building and are listed/registered at the cloud server unit under the user's account.

Next, step [408] depicts that the user triggers a voice command by saying "Hello ABC, what is the time".

Further, step [410] indicates that all nearby voice capable devices of the user, send voice trigger and the user's voice command to the cloud server unit along with extra parameters. The extra parameters includes device capabilities of the voice capable devices such as including but not limited to a current GPS location, a device ID, a QOS parameter, a trigger timestamp, a SNR etc.

Next, at step [412], the method comprises checking by the cloud server unit (i.e. via the system [100] implemented at the cloud server unit), if the trigger and command (i.e. the voice trigger and the user's voice command) is received from multiple voice capable devices from same location, based on the extra parameters and user identification via voice recognition.

Next, the method at step [414] comprises identifying by the system [100] implemented at the cloud server unit, if all voice capable devices listing to the same user.

Further, the method at step [416] comprises continuing analyzing incoming voice data independently for all devices (i.e. all voice capable devices) by the system [100] implemented at the cloud server unit, if all voice capable devices are not listing to the same user.

Also, the method at step [418] comprises identifying by the system [100] implemented at the cloud server unit, the best device to continue receiving the user command based on device capabilities of all the voice capable devices, if all voice capable devices are listing to the same user.

Next, the method at step [420] comprises communicating back by the system [100] of the cloud server unit, to all listening voice capable devices, where only one device (i.e. first target device) will continue to listen to the user commands and all other devices to stop listening the user voice commands.

Next, the method at step [422] comprises performing by the system [100] of the cloud server unit at least one of the ASR, NLP and NLU techniques to identify the user command and generating an appropriate response to the user voice command. Also, the system [100] of the cloud server unit generates the response based on the custom voice preference of the user. More particularly, the generated response encompasses an answer/action in response to the user's voice command and the custom voice preference associated with the user.

Further, the method at step [424] comprises identifying and deciding by the system [100] of the cloud server unit, the best device to deliver the response (i.e. second target device), based on all available nearby voice and non-voice capable devices.

Next, the method at step [426], the method encompasses communicating by the system [100] of the cloud server unit to the identified device, to deliver the response back to the user, along with extra parameters which includes custom voice preference for the given user.

Further, at step [428], the identified device responds back to the user using the custom voice preference of that user.

The method thereafter terminates at step [430].

Thus, the present invention provides a novel solution to provide a custom response to a voice command of a specific user. More particularly, the present disclosure provides solution for user voice preference with customized voice preference set on user's personal voice enabled device, e.g.: user's personal smartphone device. Also, the present invention provides a solution to the existing problems related to the voice capable devices by providing a customized voice identity where each device can speak with different voice (male or female voice). The present invention also provides solution to handle scenarios where user has multiple voice trigger enabled devices that accept the same voice command and provide a unified user experience across all these devices with customized voice identity. Also, the present disclosure provides solution where a user can set the voice output preference to male or female voice and further customize the voice preference to have different voice type and voice ages e.g. child, teenage, adult, etc.

Further, the systems/units depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home/building and may include network devices located outside of the user's home/building. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for providing a custom response to a voice command of a specific user, the method comprising:

receiving, at a transceiver of a cloud server from a user device, a custom voice response preference setting associated with the specific user;

receiving, at the transceiver of the cloud server, a voice command trigger from the specific user through one or more voice capable devices present in a vicinity of the specific user;

identifying, by a processor of the cloud server, a first target device, from the one or more voice capable devices present in the vicinity of the specific user to continue receiving voice commands from the specific user, wherein the first target device is identified based on at least one of a real time global positioning system (GPS) location data associated with the one or more voice capable devices, a device identification (ID) of the one or more voice capable devices, a voice command trigger timestamp associated with the one or more voice capable devices, a signal to noise ratio (SNR) associated with the one or more voice capable devices, and a Quality parameter (QoS) associated with the one or more voice capable devices;

in response to receiving the voice commands, generating, by the processor of the cloud server, a custom response to the voice commands of the specific user based at least on the custom voice response preference setting associated with said specific user, wherein the custom voice response preference setting comprises a customized voice identity, including a specific user preferred voice type and a specific user preferred voice age, and predicting, by the processor of the cloud server, a likelihood that the voice command of the specific user will evolve into a conversation mode, wherein the prediction is based on at least previous contextual information of the specific user;

identifying, by the processor of the cloud server, based on the predicted likelihood, a second target device to transmit the generated custom response including the specific user preferred voice type and the specific user preferred voice age to the second target device; and providing the generated custom response including the specific user preferred voice type and the specific user preferred voice age to the specific user via the identified second target device.

2. The method as claimed in claim 1, wherein the custom voice response preference setting is configured at the user device based on one of a user input and an automatic recommendation.

3. The method as claimed in claim 1, wherein the providing, by the processor of the cloud server, the generated custom response to the voice commands further comprises providing, via the second target device, the generated custom response to the voice commands using the customized voice identity.

4. The method as claimed in claim 1, wherein the second target device is identified based on one or more device capabilities of the one or more devices present in the vicinity of the specific user.

5. A system for providing a custom response to a voice command of a specific user, the system comprising:
   a transceiver configured to:
      receive, from a user device, a custom voice response preference setting associated with the specific user, and
      receive a voice command trigger from the specific user through one or more voice capable devices present in a vicinity of the specific user; and
   a processor configured to:
      identify, a first target device, from the one or more voice capable devices present in the vicinity of the specific user to continue receiving voice commands from the specific user, wherein the first target device is identified based on at least one of a real time global positioning system (GPS) location data associated with the one or more voice capable devices, a device identification (ID) of the one or more voice capable devices, a voice command trigger timestamp associated with the one or more voice capable devices, a signal to noise ratio (SNR) associated with the one or more voice capable devices, and a Quality parameter (QoS) associated with the one or more voice capable devices;
      in response to receiving the voice commands, generate, a custom response to the voice commands of the specific user based at least on the custom voice response preference setting associated with said specific user, wherein the custom voice response preference setting comprises a customized voice identity, including a specific user preferred voice type and a specific user preferred voice age, and predicting a likelihood that the voice command of the specific user will evolve into a conversation mode, wherein the prediction is based on at least previous contextual information of the specific user;
      identifying, based on the predicted likelihood, a second target device to transmit the generated custom response including the specific user preferred voice type and the specific user preferred voice age to the second target device; and
      provide, the generated custom response including the specific user preferred voice type and the specific user preferred voice age to the specific user via the identified second target device.

6. The system as claimed in claim 5, wherein the custom voice response preference setting is configured at the user device based on one of a user input and an automatic recommendation.

7. The system as claimed in claim 5, wherein the processor is further configured to provide the generated custom response to the voice commands via the second target device using the customized voice identity.

8. The system as claimed in claim 5, wherein the second target device is identified based on one or more device capabilities of the one or more devices present in the vicinity of the specific user.

9. A user equipment for providing a custom response to a voice command of a specific user, the user equipment comprising:
   a system configured to:
   receive, from a user device, a custom voice response preference setting associated with the specific user,
   receive a voice command trigger from the specific user through one or more voice capable devices present in a vicinity of the specific user,
   identify a first target device, from the one or more voice capable devices present in the vicinity of the specific user to continue receiving voice commands from the specific user, wherein the first target device is identified based on at least one of a real time global positioning system (GPS) location data associated with the one or more voice capable devices, a device identification (ID) of the one or more voice capable devices, a voice command trigger timestamp associated with the one or more voice capable devices, a signal to noise ratio (SNR) associated with the one or more voice capable devices, and a Quality parameter (QoS) associated with the one or more voice capable devices;
   in response to receiving the voice commands, generate, a custom response to the voice commands of the specific user based at least on the custom voice response preference setting associated with said specific user, wherein the custom voice response preference setting comprises a customized voice identity, including a specific user preferred voice type and a specific user preferred voice age, and predicting a likelihood that the voice command of the specific user will evolve into a conversation mode, wherein the prediction is based on at least previous contextual information of the specific user,
   identifying, based on the predicted likelihood, a second target device to transmit the generated custom response including the specific user preferred voice type and the specific user preferred voice age to the second target device, and provide, the generated custom response including the specific user preferred voice type and the specific user preferred voice age to the specific user via the identified second target device.

10. A method for providing a custom response to a voice command of a specific user, the method comprising:

receiving, at a transceiver of a user equipment from a user device, a custom voice response preference setting associated with the specific user;

receiving, at the transceiver of the user equipment, a voice command trigger from the specific user through one or more voice capable devices present in a vicinity of the specific user;

identifying, by a processor of the user equipment, a first target device, from the one or more voice capable devices present in the vicinity of the specific user to continue receiving voice commands from the specific user, wherein the first target device is identified based on at least one of a real time global positioning system (GPS) location data associated with the one or more voice capable devices, a device identification (ID) of the one or more voice capable devices, a voice command trigger timestamp associated with the one or more voice capable devices, a signal to noise ratio (SNR) associated with the one or more voice capable devices, and a Quality parameter (QoS) associated with the one or more voice capable devices;

in response to receiving the voice commands, generating, by the processor of the user equipment, a custom response to the voice commands of the specific user based at least on the custom voice response preference setting associated with said specific user, wherein the custom voice response preference setting comprises a customized voice identity, including a specific user preferred voice type and a specific user preferred voice age, and predicting, by the processor of the user equipment, a likelihood that the voice command of the specific user will evolve into a conversation mode, wherein the prediction is based on at least previous contextual information of the specific user;

identifying, by the processor of the user equipment, based on the predicted likelihood, a second target device to transmit the generated custom response including the specific user preferred voice type and the specific user preferred voice age to the second target device; and providing the generated custom response including the specific user preferred voice type and the specific user preferred voice age to the specific user via the identified second target device.

\* \* \* \* \*